Feb. 25, 1958  H. G. BOLMES ET AL  2,824,754
TRAILER COUPLING
Filed Jan. 3, 1956
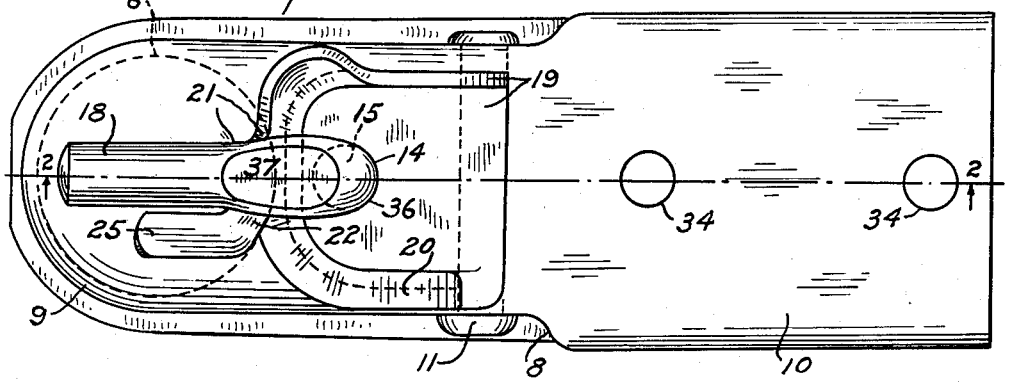
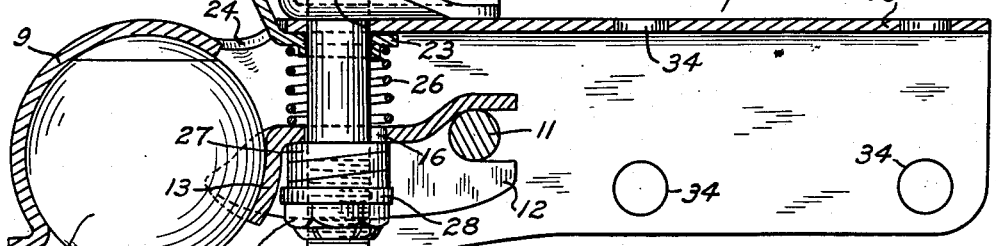
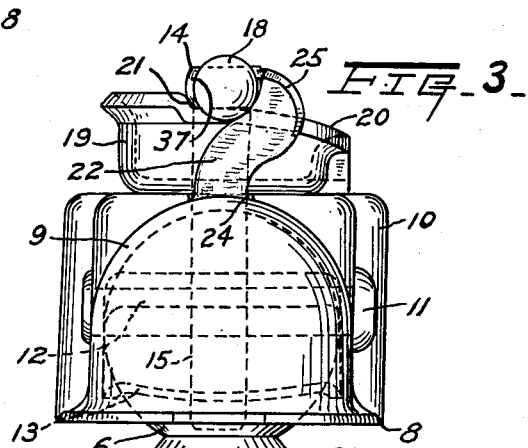
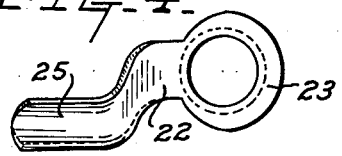
INVENTORS.
H. G. Bolmes
BY B. R. Weber
Lieber & Lieber
ATTORNEYS.

United States Patent Office 2,824,754
Patented Feb. 25, 1958

2,824,754

TRAILER COUPLING

Henry G. Bolmes, West Allis, and Bernard R. Weber, Wauwatosa, Wis., assignors to The Fulton Company, West Allis, Wis., a corporation of Wisconsin Application January 3, 1956, Serial No. 556,883

5 Claims. (Cl. 280—512)

The present invention relates generally to improvements in couplings for interconnecting draft and trailer vehicles, and relates more specifically to improvements in the construction and operation of ball and socket trailer couplings.

The main object of this invention is to provide an improved vehicle coupling which is simple and durable in construction, and wherein the connecting members may be readily interconnected or detached.

Ball and socket type trailer couplings wherein a ball member attached to the rear of a hauling vehicle is universally movably cooperable with a socket member secured to the draft beam of a trailer, have long been extensively used. In most of these prior coupling devices, the ball member is normally confined within the socket member by means of a retaining clamp capable of being released with the aid of a hand wheel or the like in order to permit separation of the members when it is desired to uncouple the trailer from the draft vehicle. While these prior trailer couplings are relatively satisfactory during normal use, they are rather difficult to manipulate when attaching and releasing the trailer; and although some quick releasable couplings of this general type have heretofore been proposed, these have not proven entirely satisfactory primarily because they were too complicated and failed to positively guard against accidental separation of the members during normal use.

It is therefore an important more specific object of the present invention to provide an improved ball and socket type of trailer coupling which may be conveniently coupled and uncoupled, and wherein the ball and socket members are positively maintained interconnected during normal use of the assemblage.

Another important object of this invention is to provide a compact and sturdy quick releasable vehicle coupling in which the parts are effectively adjusted to compensate for wear.

A further important object of the invention is to provide a rapidly connectible and disconnectible ball and socket trailer coupling comprising relatively few simple parts which can be readily constructed, assembled and dismantled.

Still another important object of the present invention is to provide an improved trailer coupling the various parts of which can be manufactured of sheet metal to produce a durable and relatively inexpensive unit adapted to be operated and utilized with utmost safety.

These and other more specific objects and advantages of the invention will be apparent from the following detailed description from which it will be noted that the gist of the improvement is the provision of means associated with the ball retaining clamp of a ball and socket type of vehicle trailer coupling for effecting rapid interconnection and release of the coupling members while insuring maximum safety during normal use of the assemblage.

A clear conception of the features constituting the present improvement, and of the construction and operation of a typical trailer coupling embodying the invention, may be had by referring to the drawing accompanying and forming a part of this specification in which like reference characters designate the same or similar parts in the various views.

Fig. 1 is a top view of one of the improved trailer couplings fully assembled and ready for attachment to the hauling and trailing vehicles;

Fig. 2 is a side and part sectional view taken centrally and longitudinally through the coupling assemblage of Fig. 1 along the line 2—2;

Fig. 3 is an end view of the same assemblage looking toward the ball and socket thereof; and Fig. 4 is a top view of the locking latch of the same coupling.

While the invention has been shown and described herein as having been incorporated in a ball and socket trailer coupling formed primarily of sheet metal, it is not intended to restrict the use of the improved features to such an assemblage; and it is also contemplated that specific descriptive terms used herein be given the broadest possible interpretation consistent with the disclosure.

Referring to the drawing, the improved quick releasable universally movable trailer coupling illustrated, comprises in general, a ball member 6 having a rigid mounting shank 7; a socket member 8 having at one end a spherical zone socket 9 cooperable with the ball member 6 while its opposite end 10 is formed for attachment to a trailer tongue and its medial portion is spanned by a pivot 11; a ball retainer clamp 12 swingably suspended from the pivot 11 and having a spherical zone portion 13 cooperable with the socket 9 to hold the ball member 6 within the socket; a latch bolt 14 having an upright threaded pivot shank 15 confined within alined openings 16, 17 formed in the clamp 12 and member 8 respectively, and being provided with a laterally extending upper handle 18; an arcuate element 19 secured to the top of the socket member 8, and having thereon an upper cam surface 20 and a stop abutment 21 cooperable with the latch handle 18; a locking latch 22 having a seat 23 at its lower end embracing the latch shank 15 and engaging an inner upper surface of the member 8 while its medial portion extends through a slot 24 in the socket member 8 and its upper actuating extremity 25 is cooperable with the bolt handle 18; a helical compression spring 26 surrounding the bolt shank 15 and coacting with the latch seat 23 and with the top of the clamp 12; and a wear compensating compression spring 27 coacting with a lower surface of the clamp 12 and with a washer 28 adjustably confined upon the threaded bolt shank 15 by a self locking nut 29.

The ball member 6, socket member 8, retainer clamp 12, element 19 and locking latch 22 may all be formed of durable sheet metal with the aid of punches and dies, and the ball member 6 is provided with a sturdy base 31 adapted to be firmly clamped to the bumper or frame of a towing vehicle by means of a lock washer 32 and a nut 33 coacting with the threaded ball mounting shank 7 in a well known manner. The rear end 10 of the socket member 8 has inverted U-shaped transverse cross-section and is provided with holes 34 for receiving trailer attaching bolts, and the pivot 11 may be riveted or welded to the opposite side walls of the member 8. The rear end of the ball retainer clamp 12 has opposite side walls which are preferably bifurcated for detachable coaction with the pivot 11 as shown in Fig. 2, and the opening 16 is elongated so as to permit the clamp 12 to swing about the pivot 11 without interfering with the upright latch bolt shank 15.

The upright shank 15 of the latch bolt 14, is journalled for rotation within the alined openings 16, 17 and in a coaxial opening 36 formed in the base of the cam element 19, and this bolt 14 is formed of wear resistant material and has the portion 37 of its handle 18 directly adjoining to the shank 15, flattened to provide greater bearing area on the cam surface 20. The cam element 19 is firmly permanently attached to the top of the socket member 8 as by welding; and the upper cam surface 20 of this element 19 with which the portion 37 of the latch bolt 14 coacts, may be hardened so as to resist excessive wear; and is also widened in order to provide greater bearing surface. The location and formation of this cam surface 20 is very important, and it will be noted from Figs. 1 and 2, that this surface 20 is gradually inclined and approaches the shank 15 of the bolt 14 near its uppermost portion adjacent to the stop abutment 21.

The locking latch 22 is constructed as shown in detail in Figs. 2, 3 and 4, and the seat 23 thereof is annular and loosely surrounds the shank 15 of the latch bolt 14 while also providing a retaining seat for the upper end of the spring 26. The latch 22 is constantly urged upwardly by this spring 26 to cause its upper handle extremity 25 to be disposed closely adjacent to the handle 18 of the latch bolt 14 and to thus positively hold this handle 18 against the end abutment 21 of the cam element 19 as depicted in the drawing; but when the latch extremity 25 is depressed the latch bolt 14 may be swung in a counter-clockwise direction as viewed in Fig. 1, whereupon the flattened portion 37 of the handle 18 will ride downwardly along the inclined cam surface 20 and will thereby lower the ball clamp 12 into ball releasing position under the influence of the spring 26.

When the various parts of the improved trailer coupling have been constructed as above described, the various parts which are normally carried by the socket member 8, may be readily assembled thereon by applying the rear bifurcation of the retainer clamp 12 to the fixed pivot 11; by thereafter inserting the shank 15 of the latch bolt 14 through the openings 36, 17, latch seat 23, spring 26, opening 16, spring 27, and washer 28 in succession; and by finally applying the lock nut 29 to the threaded lower end of the bolt shank 15, as in Fig. 1. The ball member may then be inserted within the socket 9 of the member 8 by releasing the locking latch 22 and swinging the bolt handle 18 into its lowermost position as previously described, whereupon the lighter spring 26 will lower the retainer clamp 12 sufficiently to permit free insertion of the ball.

The handle 18 of the latch bolt 14 may subsequently be swung in the opposite direction to cause the handle portion 37 to ride upwardly along the inclined cam surface 20 and to thereby raise the clamp 12 into ball retaining position, and when the handle 18 rides over the latch portion 25 and engages the stop abutment 21 the latch handle portion 25 will automatically assume locking position as illustrated. The lock nut 29 may then be finally adjusted to cause the heavy spring 27 to exert the desired pressure against the retainer clamp 12 necessary to cause the spherical zone portion 13 thereof to properly coact with the spherical surface of the ball member 6, thus completing the final assembly operation.

From the foregoing detailed description of the construction and operation of the typical trailer coupling shown, it will be apparent that the present invention in fact provides a coupling device which can be quickly and readily assembled, connected or disconnected, while being normally usable with utmost safety and dependability. The improved coupling comprises relatively few simple but durable parts which can be conveniently manipulated without the aid of special tools, and the light spring 26 normally functions to constantly urge the locking latch 22 upwardly and the retainer clamp 12 downwardly, while the heavy spring 27 serves to compensate for wear on the ball and socket surfaces and to thereby prevent excessive looseness. It is also noteworthy that while the retainer clamp 12 in the present disclosure is pivotally suspended, such swingable suspension is not essential as long as this clamp is movable relative to the ball.

The formation of the inclined cam surface 20 approaching the axis of the bolt shank 15 near its upper end, and the provision of the abutment 21 at the uppermost extremity of this surface, are important features of the invention; and although the locking latch 22 must be manually released whenever it is desired to disconnect the coupling members 6, 8, this latch 22 automatically snaps into locking position whenever the bolt handle 18 is swung over and past the latch extremity 25. The improved couplings may be produced in various sizes and at moderate cost primarily of sheet metal with the aid of punches and dies, and have proven highly satisfactory and successful in actual use.

It should be understood that it is not desired to limit this invention to the exact details of construction and operation of the ball and socket trailer coupling herein specifically shown and described, for various modifications within the scope of the appended claims may occur to persons skilled in the art.

We claim:

1. In a trailer coupling, coacting universally relatively movable ball and socket members formed for attachment to hauling and trailing vehicles, a ball retainer clamp pivotally suspended from said socket member, a latch bolt having a shank journalled for rotation in said socket member and swingably supporting said retainer clamp at one end while its opposite end is provided with a lateral handle, a cam carried by said socket member and coacting with said bolt handle to swing said retainer clamp into ball retaining position when said bolt shank is rotated, and a locking latch having a fulcrum seat at one end bearing against said socket member and also having an opposite actuating end portion cooperable with said bolt handle to positively prevent rotation of the bolt when said retainer clamp has been swung into ball retaining position.

2. In a trailer coupling, coacting ball and socket members formed for attachment to hauling and trailing vehicles, a ball retainer clamp pivotally suspended from said socket member to swing toward and away from said ball member, a latch bolt having a shank journalled for rotation in said socket member and having a manipulating handle at one end, resilient means interposed between said retainer clamp and the opposite end of said bolt shank for supporting and urging the retainer clamp into ball member holding position, a cam carried by said socket member and coacting with said bolt handle to swing said retainer clamp into ball retaining position through said resilient means when said bolt shank is rotated, and a locking latch having an annular end seat embracing said bolt and also having an opposite actuating end portion cooperable with the bolt handle to positively prevent rotation of the bolt when said retainer clamp has been swung into ball retaining position.

3. In a trailer coupling, coacting ball and socket members formed for attachment to hauling and trailing vehicles, a ball retainer clamp pivotally suspended from said socket member, a latch bolt having a shank journalled for rotation in said socket member and having a manipulating handle at one end, a compression spring interposed between said retainer clamp and the opposite end of said bolt shank for supporting and resiliently urging the retainer clamp into ball member retaining position, a cam carried by said socket member and coacting with said bolt handle to swing said retainer clamp into ball retaining position through said spring when said shank is rotated, and a locking latch having an annular end seat embracing said bolt and bearing against said socket member and also having an opposite actuating end portion cooperable with the bolt handle to positively prevent rotation of the bolt when said retainer clamp has been swung into ball retaining position.

4. In a trailer coupling, coacting ball and socket members formed for attachment to hauling and trailing vehicles, a ball retainer clamp pivotally suspended from said socket member, a latch bolt having a shank journalled for rotation in said socket member and having a laterally extending manipulating handle at one end, a compression spring interposed between said retainer clamp and the opposite end of said bolt shank for supporting and resiliently urging the retainer clamp into ball member retaining position, a cam carried by said socket member and coacting with said bolt handle to swing said retainer clamp into ball retaining position through said spring when said shank is rotated, a locking latch having an end seat embracing the bolt and coacting with said socket member and also having an opposite end actuating portion cooperable with said bolt handle to positively prevent rotation of the bolt when said retainer clamp has been swung into ball retaining position, and resilient means interposed between said retainer clamp and said locking latch seat for constantly urging said latch actuating end toward bolt rotation preventing position.

5. In a trailer coupling, coacting ball and socket members formed for attachment to hauling and trailing vehicles, a ball retainer clamp pivotally suspended from said socket member, a latch bolt having a shank journalled for rotation in said socket member and having a radial manipulating handle at one end, a relatively strong compression spring surrounding said bolt shank and being interposed between the opposite end of said shank and one side of said retainer clamp, a cam carried by said socket member and coacting with said bolt handle to swing said retainer clamp into ball retaining position through said spring when said shank is rotated, a locking latch having an end seat coacting with the bolt and with said socket member and also having an opposite radial end actuating portion cooperable with said bolt handle to positively prevent rotation of the bolt when said retainer clamp has been swung into ball retaining position, and a weaker compression spring also surrounding said bolt shank but being interposed between the opposite side of said retainer clamp and said locking latch seat for constantly urging said latch actuating portion toward bolt rotation preventing position.

References Cited in the file of this patent

UNITED STATES PATENTS

| | | |
|---|---|---|
| 2,265,850 | Martin | Dec. 9, 1941 |
| 2,521,132 | Smith | Sept. 5, 1950 |
| 2,726,099 | Nunn | Dec. 6, 1955 |

FOREIGN PATENTS

| | | |
|---|---|---|
| 256,299 | Italy | Dec. 19, 1927 |